(No Model.) 3 Sheets—Sheet 1.
J. C. BONNER.
VEHICLE.
No. 591,733. Patented Oct. 12, 1897.
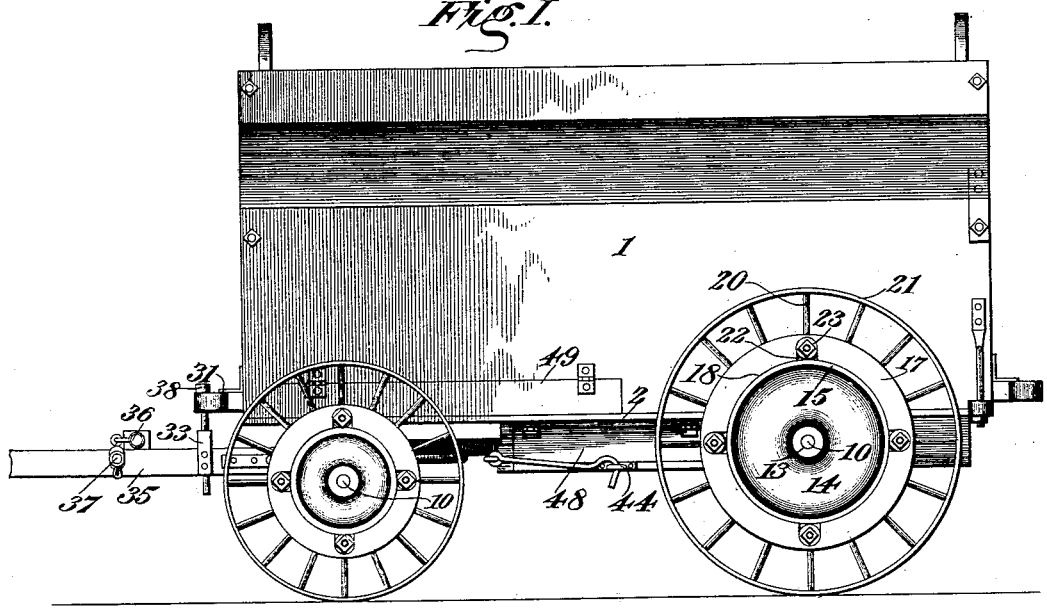
Fig. I.
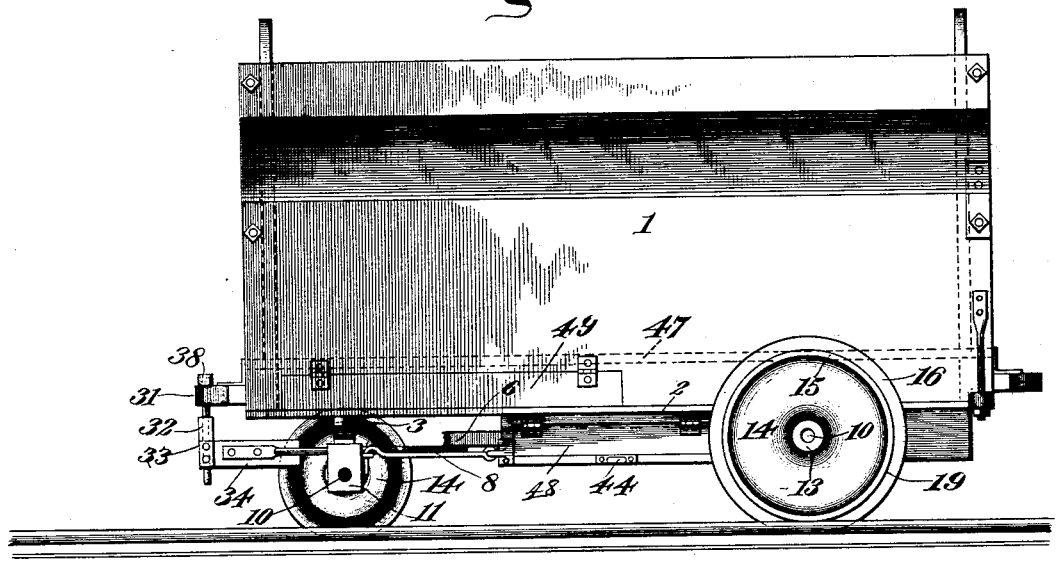
Fig. II.
Witnesses: M. E. Fowler, S. N. Acker.
Inventor: Joseph C. Bonner,
By Joseph L. Atkins, Attorney.

(No Model.) 3 Sheets—Sheet 2.
J. C. BONNER.
VEHICLE.
No. 591,733. Patented Oct. 12, 1897.
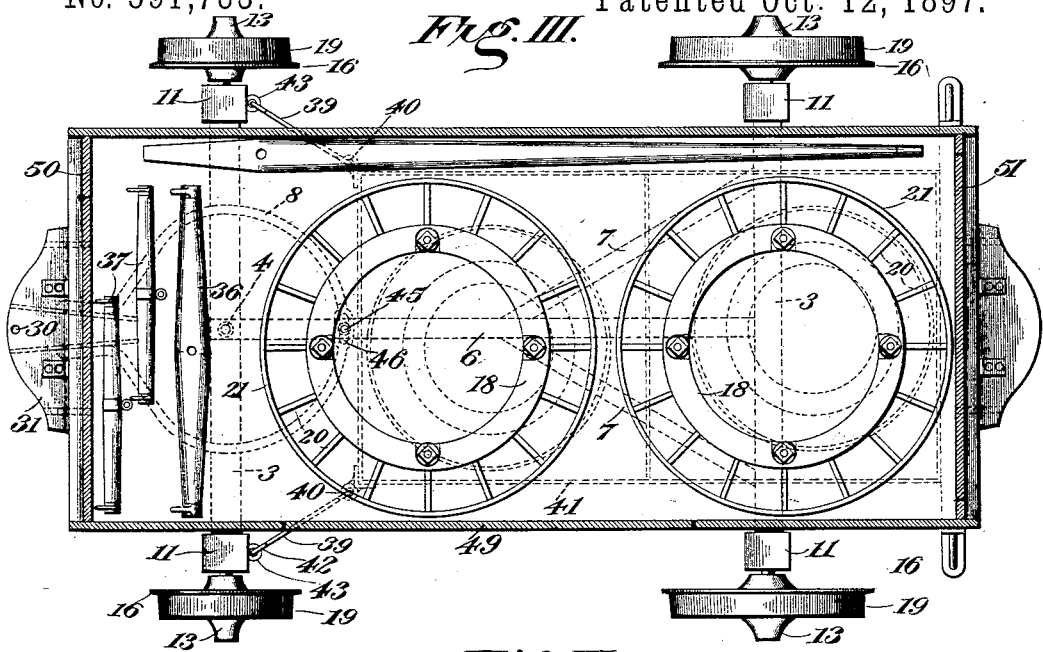
Fig. III.
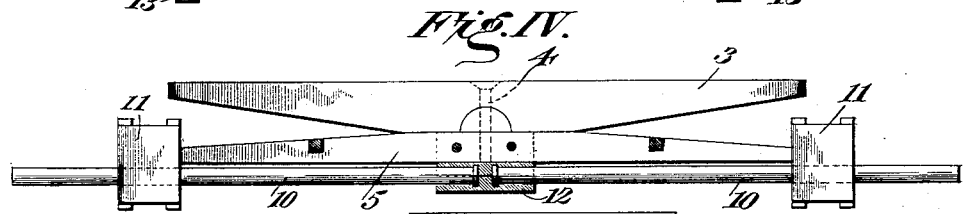
Fig. IV.
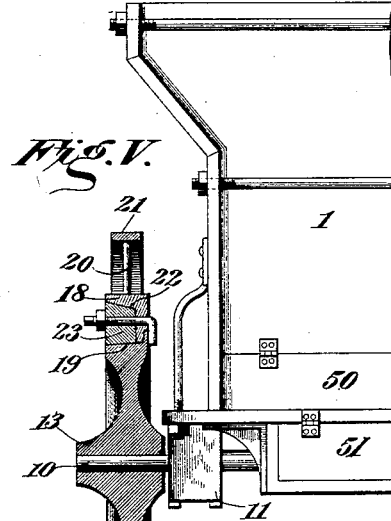
Fig. V.
Witnesses
M. E. Fowler
L. N. Acker
Inventor:
Joseph C. Bonner
By Joseph L. Atkins
Attorney (No Model.) 3 Sheets—Sheet 3.
J. C. BONNER.
VEHICLE.
No. 591,733. Patented Oct. 12, 1897.
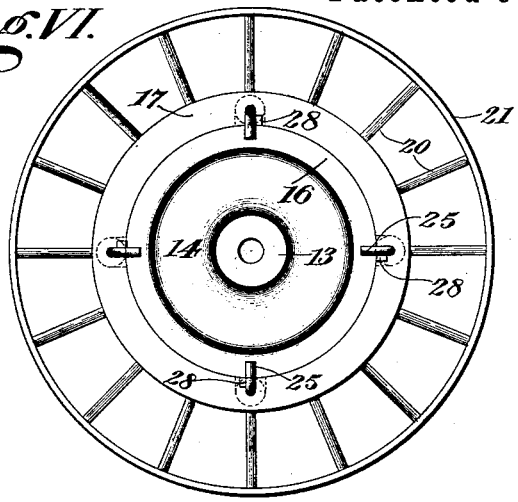
Fig. VI.
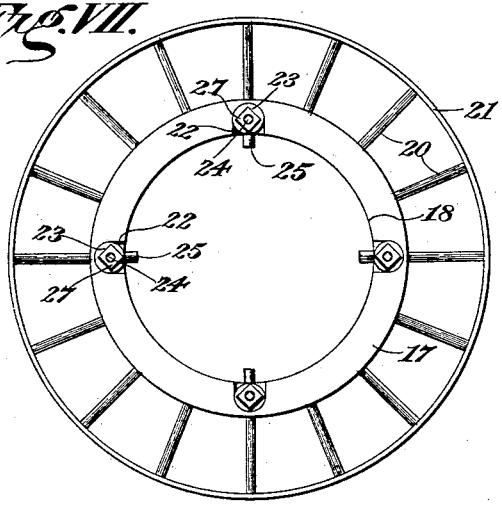
Fig. VII.
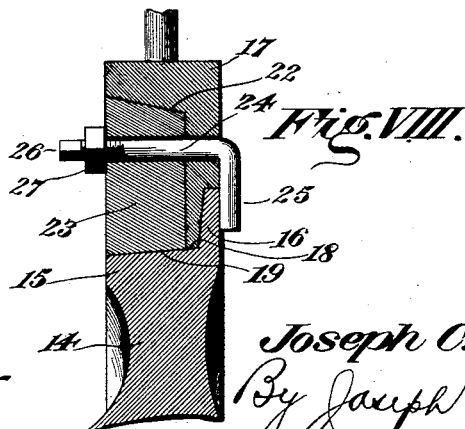
Fig. VIII.
Witnesses
M. E. Fowler
S. M. Acker
Inventor:
Joseph C. Bonner
By Joseph L. Atkins,
Attorney.

UNITED STATES PATENT OFFICE.

JOSEPH CLAYBAUGH BONNER, OF TOLEDO, OHIO.

VEHICLE.

SPECIFICATION forming part of Letters Patent No. 591,733, dated October 12, 1897.

Application filed January 11, 1897. Serial No. 618,833. (No model.)

*To all whom it may concern:*

Be it known that I, JOSEPH CLAYBAUGH BONNER, of Toledo, in the county of Lucas, State of Ohio, have invented certain new and useful Improvements in Vehicles, of which the following is a complete specification, reference being had to the accompanying drawings.

The object of my invention is to produce a convertible vehicle adapted to be used as an ordinary road-wagon or as a railway-car, preferably, but not essentially, through the employment of convertible wheels, whereby a wagon may be employed for the transportation of goods by ordinary wagon-roads or by railroad, as required, without rehandling of its contents, and by the employment of simple, effective, and convenient means for converting it from one species of vehicle to the other.

My invention is designed especially for use for transportation of merchandise from cities to near-by suburban towns, and farm products or the like from the country to market or other places of destination, and to employ to advantage horse-power or electric or similar power, as conditions may be favorable for the use of one or the other.

In the accompanying drawings, Figure I is a side elevation of my vehicle complete, equipped ready for road use. Fig. II is a similar view showing the vehicle converted into a railway-car. Fig. III is a sectional plan view on the line A A of Fig. II. Fig. IV is a rear elevation of the front axle and bearings, detached. Fig. V is a rear elevation of one-half of the wagon shown in Fig. I, with the wheel in section. Fig. VI is a view of the inside of one of the wheels shown in Fig. I. Fig. VII is a view of the other wheel-rim, detached. Fig. VIII is a sectional view showing the preferred means of attaching the road-wheel rim to the car-wheel, on a larger scale than that upon which it is drawn in Fig. V.

Referring to the figures on the drawings, 1 indicates, by way of example, a suitable body, the bottom frame 2 of which is supported upon bolsters 3. They are pivotally secured, as by bolts 4, respectively, to their respective axle-bars 5. The front and rear axles are united by a suitable reach 6, rear hounds 7, and front hounds 8, the rear end of the reach passing between the hounds 7 and secured thereto, as usual, and, passing over the front hounds 8, is secured to the front axle, as by the bolt 4, or by other usual methods.

The foregoing is, as above stated, a preferable form of construction and is, as will hereinafter appear, equally serviceable both as a road-wagon and a railway-car.

The rate of speed at which the vehicle runs in practice upon rails renders the use of wheels turning upon an axle objectionable, because of the difficulty of keeping the wearing parts properly lubricated and of insuring against separation of wheels from their respective axles. For this purpose I prefer to employ sectional rotary axles 10, the outer ends of which, respectively, are mounted in suitably-constructed journal-boxes 11, secured to the respective axle-bars 5 and adapted to hold suitable quantities of lubricating material, after the manner of the ordinary car-axle box. The axles are made in two pieces in order that when the vehicle is converted into a road-wagon the wheels may move independently when turning upon a curve. The inner ends of each of the axle-sections are carried opposite to each other in a central journal-box 12, also designed to afford required lubrication. The wheels are rigidly secured to the extremities of the axles in any suitable and ordinary manner.

As was intimated in the general statement of my invention, I prefer to use in connection with my convertible vehicle convertible wheels, which may be readily converted from road-wagon wheels to car-wheels, and vice versa. For that purpose I prefer to employ any ordinary car-wheel consisting of a hub 13, a web 14, tire 15, and rail-flange 16.

To accomplish the conversion of the car-wheel for ordinary road purposes, I prefer to employ what I will call a "road-wheel rim," an example of which is illustrated in Fig. VII. As illustrated the rim embodies a tire-band 17, whose interior surface 18 is conformable to and snugly fitted to the tread 19 of the car-wheel.

As clearly illustrated in the sectional view Fig. V of the drawings the tire-band carries, as by suitable spokes 20, an ordinary felly and tire 21. The tire-band may be fitted to the tread of the car-wheel, so that when forced into place it will maintain its position through the aid of friction alone. The construction illustrated is shown by way of example and is susceptible of variation. I prefer to provide, however, additional means for securing the parts together. For example, in the edge of the tire-band 17, at suitable intervals, I provide sockets or recesses 22, which, when the wagon-rim is in place, open against the tread of the car-wheel. (See illustration on large scale in Fig. VIII.) Within the sockets, respectively, I employ shoes or wedge-shaped blocks 23, which fit snugly between the walls of the sockets and the tread, and which when compressed into the sockets wedge between the wheel-band and the tread 19.

For the purpose of driving the shoes into place I prefer, for example, to employ for each shoe a bolt 24, whose head is formed by an angular extension 25 and whose screw-threaded extremity 26 carries a nut 27. The head 25 is of sufficient length to overlap the flange 16 of the car-wheel, so that when the nut 27 is screwed into place the parts are firmly united. Lock-nuts may also be used for this purpose. As an additional security to prevent the turning of the head 25 stop-lugs 28, projecting from the side of the wheel-band opposite each head, respectively, may be employed. Whenever it becomes necessary to separate the wheel-rim from the car-wheel, all that is necessary to do is to turn the nuts 27 to loosen the bolts, and by relieving the flange 16 from engagement with the heads 25 to draw the wheel-rim from the tread of the car-wheel.

It is necessary when the vehicle is used as a road-wagon that the front axle should turn upon the bolt 4, and when it is used as a railway-car that it should not turn.

For fixing the front axle in the immovable position numerous devices may be employed, of which, by way of example, I illustrate three varieties, any one or all of which may be employed. That which I prefer, on account of its simplicity and convenience, consists of an aperture 30 in the front bumper 31, located in vertical alinement with an aperture 32 in the bearing-frame 33 of the tongue-hounds 34. When it is designed to use the vehicle as a railway-car, the tongue 35, the whiffletree 36, and the singletree 37 being removed the bolt 38, which secures the whiffletree to the tongue, may be inserted into the apertures 30 and 32 and serve to hold the front axle rigidly in its transverse position under the body 1 and may hold the link or other usual car-coupling device.

In Fig. III another device is shown, in which links 39, pivoted, respectively, as indicated at 40, to the opposite front corners of the lower storage-compartment frame 41 and provided at their extremities with hooks 42, entering eyelets 43, projecting from the sides of the respective boxes 11, may be employed. When the hooks are not inserted in the eyelets 43, they may be carried in eyelets 44, provided for them in the sides of the frame 41. Also in the same figure is shown a bolt 45, which may be inserted through the reach 6 into an aperture 46, provided for it in the middle part of the front hounds 8. If slight oscillatory movement of the front axle is desired, the front aperture 46 may be elongated for that purpose. For the storage of the parts not in use I prefer to provide, in addition to the storage-compartment 41, a false bottom 47, which defines in the bottom of the body a compartment, access to the several compartments being available through side doors 48 and 49, respectively, and through end doors 50 and 51, respectively, in Figs. III and V.

In practice suppose the vehicle to be equipped as shown in Fig. I and it is desired to convert it to the form shown in Fig. II. The body, with the wheels and axles attached, is lifted by any suitable hoisting mechanism (not illustrated) until the wheels are free from the ground. In that position, if the wheels illustrated are employed, the nuts 27 are loosened, the bolts 24 turned, and the wheel-rims removed. The tongue and its appurtenances are taken off, the front axle adjusted by the employment of any of the means provided for the purpose, and the wagon is lowered upon the railway-track ready for service. After removal the separable parts, including the tongue, whiffle and single trees, and the wheel-rims, are stored in the compartments provided for them, as they are shown in Fig. III, and the car is ready to proceed. Instead of convertible wheels two sets of wheels may be employed, and for converting the wagon from one species to another the wheels may be interchanged. I prefer, however, for the sake of convenience and facility of handling, to employ my convertible wheel.

When the vehicle is to be converted from the form shown in Fig. II to that shown in Fig. I, it is lifted, as in the manner previously described, and the parts which were previously removed are restored to place when the wagon illustrated in Fig. I is ready for service.

It will be perceived that the conversion of the vehicle from one species to another can be accomplished with facility in a short space of time and without the necessity of disturbing the contents with which the body may be loaded.

I am aware that cars and wagons or carriages have been built with wheels provided with removable tires adapted to be replaced when worn.

I am aware also that iron car-wheels have been made with provision for shrinking rims upon them after they are constructed, but such contrivances are not within the scope of my invention.

I do not desire to restrict my invention to the details of construction herein shown and described, but reserve the right to modify and vary them within the scope of my invention.

What I claim is—

1. The combination with a body and its axles, one of which is swiveled thereto, of hounds upon the axles, a bumper upon the body, apertures in the hounds and bumper, respectively, adapted to be brought into alinement and to receive a pin for securing the axle immovably to the body, substantially as set forth.

2. In a convertible wheel, the combination with a car-wheel, provided, as usual, with tread and flange, of a wheel-rim embodying a wheel-band fitted to the tread and flange of the car-wheel, and adapted to secure the rim to the car-wheel, substantially as set forth.

3. In a convertible wheel, the combination with a car-wheel provided, as usual, with tread and flange, of a wheel-rim embodying a wheel-band fitted to the tread and flange of a car-wheel, and means for uniting the band to the car-wheel, substantially as set forth.

4. In a convertible wheel, the combination with a car-wheel provided with tread and flange, of a wheel-rim embodying a wheel-band, sockets in the wheel-band, shoes in the sockets, and means for forcing the shoes in the sockets against the tread of the car-wheel for fastening the wheel-rim in place upon the car-wheel, substantially as set forth.

5. In a convertible wheel, the combination with a car-wheel provided with the usual tread and flange, of a wheel-rim embodying a wheel-band fitted to the tread and flange, sockets in the rim, shoes in the sockets, bolts passing through the rim, and the shoes, respectively, a head on the bolt adapted to engage with the flange of the car-wheel, and a nut screwing on the opposite extremity of the bolt for uniting the parts together, substantially in the manner and for the purpose specified.

6. In a convertible vehicle, the combination with a body part, and interchangeable wheels, of bumpers attached to the body part, and serving the purpose of a coupler when the vehicle is used as a railroad-car, substantially as set forth.

In testimony of all which I have hereunto subscribed my name.

JOSEPH CLAYBAUGH BONNER.

Witnesses:
NELLIE TURNEY BONNER,
DOROTHY BONNER.